US008013090B2

(12) United States Patent
Ishiguro et al.

(10) Patent No.: US 8,013,090 B2
(45) Date of Patent: Sep. 6, 2011

(54) FILM COMPRISING NORBORNENE COMPOUND ADDITION POLYMER

(75) Inventors: Atsushi Ishiguro, Tokyo (JP); Yoshihisa Takeyama, Tokyo (JP); Yasuo Tsunogae, Tokyo (JP)

(73) Assignee: Zeon Corporation, Tokyo (JP)

( * ) Notice: Subject to any disclaimer, the term of this patent is extended or adjusted under 35 U.S.C. 154(b) by 346 days.

(21) Appl. No.: 12/223,324

(22) PCT Filed: Jan. 26, 2007

(86) PCT No.: PCT/JP2007/051250
§ 371 (c)(1),
(2), (4) Date: Dec. 17, 2008

(87) PCT Pub. No.: WO2007/086499
PCT Pub. Date: Aug. 2, 2007

(65) Prior Publication Data
US 2009/0275719 A1 Nov. 5, 2009

(30) Foreign Application Priority Data

Jan. 30, 2006 (JP) .................. 2006-020138
Jan. 30, 2006 (JP) .................. 2006-020139

(51) Int. Cl.
*C08F 232/08* (2006.01)
*C08F 232/04* (2006.01)
*C09K 19/32* (2006.01)
(52) U.S. Cl. ......... 526/281; 526/282; 526/283; 428/1.1; 428/523
(58) Field of Classification Search .................. 526/281, 526/282, 283; 428/1.1, 523
See application file for complete search history.

(56) References Cited

U.S. PATENT DOCUMENTS

| | | | |
|---|---|---|---|
| 5,334,424 A | 8/1994 | Hani et al. | |
| 5,705,503 A | 1/1998 | Goodall et al. | |
| 6,310,160 B1 | 10/2001 | Kodemura | |
| 2002/0042461 A1 | 4/2002 | Oshima et al. | |
| 2004/0116555 A1 | 6/2004 | Naruse et al. | |
| 2005/0171310 A1 | 8/2005 | Oshima et al. | |

FOREIGN PATENT DOCUMENTS

| | | |
|---|---|---|
| EP | 0 594 147 A1 | 4/1994 |
| JP | 5-61026 A | 3/1993 |
| JP | 6-107735 A | 4/1994 |
| JP | 6-107736 A | 4/1994 |
| JP | 6-136057 A | 5/1994 |
| JP | 6-202091 A | 7/1994 |
| JP | 8-198919 A | 8/1996 |
| JP | 11-505880 A | 5/1999 |
| JP | 2001-98026 A | 4/2001 |
| JP | 2002-114826 A | 4/2002 |
| JP | 2003-68446 A | 3/2003 |
| JP | 2004-51949 A | 2/2004 |
| JP | 2004-107541 A | 4/2004 |
| JP | 2004-151573 A | 5/2004 |
| WO | WO-94/02521 A1 | 2/1994 |
| WO | WO-98/14499 A1 | 4/1998 |
| WO | WO-03/099887 A1 | 12/2003 |

OTHER PUBLICATIONS

Machine Translation of JP 2001-098026; publication date: Apr. 2001.*
Machine Translation of JP 06-107735; publication date: Apr. 1994.*

* cited by examiner

*Primary Examiner* — Fred M Teskin
(74) *Attorney, Agent, or Firm* — Birch, Stewart, Kolasch & Birch, LLP

(57) ABSTRACT

A film comprising a norbornene (NB) compound addition polymer that is excellent in chemical resistance, optical properties and the like, has a high Tg, a low water absorption ratio and a low linear expansion coefficient, and is soluble in an ordinary solvent.

The film comprising a NB compound addition polymer essentially consisting of repeating units derived from NB compound monomers, wherein the addition polymer has a specific Mw and has a sum of the units (A1) and (A2) of 70% by mol or more based on the total units, wherein the molar number of each unit satisfies the following equations: $70/30 \leq [\{(A1)+(A2)\}/(B)] \leq 100$ and $10/90 \leq (A1)/(A2) \leq 98/2$, or the addition polymer has a specific Mw and Mn and essentially consists of the units (A1) and (B), wherein the molar number of each unit satisfies the following equation: $70/30 \leq [(A1)/(B)] \leq 98/2$.

10 Claims, No Drawings

FILM COMPRISING NORBORNENE COMPOUND ADDITION POLYMER

TECHNICAL FIELD

The present invention relates to a film excellent in dimensional stability comprising a norbornene compound addition polymer. More specifically, the invention relates to a film that is comprised of a norbornene compound addition polymer and hardly suffers from dimensional changes even when temperature and humidity of the use environment fluctuate.

BACKGROUND ART

Inorganic glass has been generally used in the field of an optical part such as a lens, and an optical material such as a liquid crystal display device, a color filter, an EL display device substrate and other display substrate, a backlight or a light guide plate. However, inorganic glass has such defects that it is fragile, lacks flexibility, has a large specific gravity and is poor in processability, and thus is unsatisfactory for satisfying demands for weight reduction, size reduction and densification in recent years. Accordingly, there is a strong demand for replacement thereof with a transparent resin.

Upon applying a transparent resin to the optical material field, significantly high performances are required in heat resistance, chemical resistance and low water absorption properties, in addition to transparency. For example, in the production of a display device substrate, which requires a high temperature processing step for laminating a metal or metal oxide thin film, deformation of the substrate under heat, dimensional change due to absorption of water, or the like causes problems. However, an acrylic resin and a polycarbonate resin, which have been used as an optical material, have defects of low heat resistance and large water absorption properties, and thus are not sufficient.

Under the circumstances, a cycloolefin addition polymer has been proposed as a resin that satisfies transparency, heat resistance, chemical resistance, low water absorption properties and optical properties, and a material for a liquid crystal display substrate using the polymer has been also proposed (Patent Document 1).

A cycloolefin addition polymer, particularly polynorbornene, has a high glass transition temperature of 250° C. or higher, and is therefore a material that is excellent in resistance to heat deformation upon processing at a high temperature. Furthermore, polynorbornene has such characteristics that it is excellent in dimensional stability on fluctuation in humidity in the use environment owing to significantly low hygroscopicity and that it is excellent in dimensional stability on fluctuation in heat owing to the low linear expansion coefficient of about 55 ppm.

However, polynorbornene has a problem that it cannot be formed into a film by a casting method due to low solubility thereof in a common solvent.

Accordingly, various improvements of polynorbornene have been studied, and (1) an addition copolymer with an α-olefin such as ethylene (Patent Document 2), (2) an addition copolymer with a norbornene substituted with a linear hydrocarbon group (Patent Document 3), (3) an addition copolymer with a norbornene compound having a specific cyclic saturated hydrocarbon group (Patent Document 4), (4) an addition copolymer with a norbornene compound having a polar group (Patent Documents 5 and 6), and the like have been proposed.

However, the norbornene/ethylene copolymer (1) has problems that it is difficult to produce a polymer having a glass transition temperature of 200° C. or higher and that the linear expansion coefficient is increased to about from 70 to 100 ppm. The addition copolymer with norbornene substituted with a linear hydrocarbon group (2) also has the similar problems of decrease in glass transition temperature and increase in linear expansion coefficient. The addition copolymer with a norbornene compound having a particular cyclic saturated hydrocarbon group (3) is impractical due to difficulty in the synthesis of the particular norbornene compound, and the solubility in a common solvent is not necessarily enhanced. The norbornene copolymer having a polar group (4) is exemplified by a copolymer with a norbornene compound having a long-chain ester group or a silyl group as a polar group, but it has a problem of an increased water absorption ratio, and also has a problem of a largely increased linear expansion coefficient.

Patent Document 1: JP-A-5-61026
Patent Document 2: JP-A-6-202091
Patent Document 3: JP-A-8-198919
Patent Document 4: JP-A-2004-51949
Patent Document 5: JP-T-11-505880
Patent Document 6: JP-A-2002-114826

DISCLOSURE OF THE INVENTION

Problems to be Solved by the Invention

Accordingly, an object of the invention is to provide a film that is comprised of a norbornene compound addition polymer and is excellent not only in transparency, chemical resistance and optical properties, but also in heat resistance and dimensional stability, and applications thereof, and more specifically, to provide a film that is comprised of a norbornene compound addition polymer soluble in a common solvent and has a high glass transition temperature, a low water absorption ratio and a low linear expansion coefficient, and applications thereof.

Means for Solving the Problems

We, the inventors, made earnest investigations for attaining the objects, and have found that a norbornene compound addition polymer that comprises a repeating unit of an unsubstituted norbornene compound monomer and a repeating unit of a norbornene compound monomer having a specific substituent and has a specific molecular weight is excellent in solubility in a common solvent and that a film formed from the addition polymer has lower linear expansion property while maintaining the heat resistance and the low water absorption properties. Thus, we have completed the invention based on the findings.

According to the invention, a film comprising a norbornene compound addition polymer (I) or a norbornene compound addition polymer (II) is provided. The norbornene compound addition polymer (I) is a polymer essentially consisting of repeating units derived from norbornene compound monomers, wherein a sum of the following repeating unit (A1) and the following repeating unit (A2) is 70% by mol or more based on the total repeating units derived from norbornene compound monomers in the norbornene compound addition polymer (I); a ratio, [{(A1)+(A2)}/(B)], of a total molar number of a molar number of the repeating unit (A1) and a molar number of the repeating unit (A2) to a molar number of the following repeating unit (B) in the norbornene compound addition polymer (I) is in the range of from 70/30 to 100/0; a ratio, [(A1)/(A2)], of a molar number of the repeating unit (A1) to a molar number of the repeating unit (A2) in the norbornene compound addition polymer (I) is in the range of from 10/90 to 98/2; and a weight average molecular weight of the norbornene compound addition polymer (I) is from 50,000 to 1,000,000.

The norbornene compound addition polymer (II) is a polymer essentially consisting of the following repeating unit (A1) and the following repeating unit (B), wherein a ratio, [(A1)/(B)], of a molar number of the repeating unit (A1) to a molar number of the repeating unit (B) in the norbornene compound addition polymer (II) is in the range of from 70/30 to 98/2; a weight average molecular weight of the norbornene compound addition polymer (II) is from 300,000 to 700,000; and a number average molecular weight of the norbornene compound addition polymer (II) is from 80,000 to 350,000.

Repeating unit (A1): a repeating unit derived from a norbornene compound monomer consisting of carbon atoms and hydrogen atoms with all the carbon atoms being involved in constitution of a condensed ring skeleton.

Repeating unit (A2): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a hydrocarbon group having 2 or less carbon atoms.

Repeating unit (B): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a functional group having 2 or less carbon atoms or substituted with only a functional group having 2 or less carbon atoms and a hydrocarbon group having 2 or less carbon atoms.

It is preferred that, in the film of the invention, the norbornene compound addition polymers (I) and (II) are each a norbornene compound addition polymer that comprises, as the repeating unit (A1), a repeating unit derived from a norbornene compound monomer (a1) having no other unsaturated bond than a norbornene ring.

It is preferred that, in the film of the invention, the repeating unit (A2) is a repeating unit derived from a norbornene compound having an alkyl group having 2 or less carbon atoms or a tetracyclo[6.2.1.1$^{3,6}$.0$^{2,7}$]dodec-4-ene compound having an alkyl group having 2 or less carbon atoms.

It is preferred that, in the film of the invention, a weight average molecular weight of the norbornene compound addition polymer (I) is from 300,000 to 700,000 and a number average molecular weight of the norbornene compound addition polymer (I) is from 80,000 to 350,000.

The film of the invention preferably has a linear expansion coefficient of 75 ppm/° C. or less.

The film of the invention preferably has a water absorption ratio of 0.1% by weight or less.

The film of the invention may have a transparent electroconductive film laminated thereon.

The film of the invention may have a gas barrier film laminated thereon.

The film of the invention is favorably used as an optical film.

The film of the invention is favorably used as a member for a display device.

The "film" in the invention is a concept that includes both "film" and "sheet", which are distinguished strictly based on the thickness thereof.

ADVANTAGES OF THE INVENTION

The norbornene compound addition copolymers (I) and (II) used in the invention are excellent in solubility in a common solvent, and the film of the invention formed of the addition copolymers is excellent in heat resistance in addition to transparency and optical properties, and has a low water absorption ratio and a low linear expansion coefficient, and the film is therefore useful as an optical material.

BEST MODE FOR CARRYING OUT THE INVENTION

Norbornene Compound Addition Polymer

The norbornene compound addition polymer for obtaining the film of the invention is a norbornene compound addition polymer (I) essentially consisting of repeating units derived from norbornene compound monomers or a norbornene compound addition polymer (II) essentially consisting of the following repeating unit (A1) and the following repeating unit (B). The norbornene compound addition polymer (I) has a sum of the following repeating unit (A1) and the following repeating unit (A2) of 70% by mol or more based on the total repeating units derived from norbornene compound monomers, a ratio, [{(A1)+(A2)}/(B)], of a total molar number of a molar number of the repeating unit (A1) and a molar number of the repeating unit (A2) to a molar number of the following repeating unit (B) of in a range of from 70/30 to 100/0, a ratio [(A1)/(A2)], of a molar number of the repeating unit (A1) to a molar number of the repeating unit (A2) of in a range of from 10/90 to 98/2, and a weight average molecular weight of from 50,000 to 1,000,000.

The norbornene compound addition polymer (II) has a ratio, [(A1)/(B)], of a molar number of the repeating unit (A1) to a molar number of the repeating unit (B) of in a range of from 70/30 to 98/2, a weight average molecular weight of from 300,000 to 700,000, and a number average molecular weight of from 80,000 to 350,000.

Repeating unit (A1): a repeating unit derived from a norbornene compound monomer consisting of carbon atoms and hydrogen atoms with all the carbon atoms being involved in constitution of a condensed ring skeleton.

Repeating unit (A2): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a hydrocarbon group having 2 or less carbon atoms.

Repeating unit (B): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a functional group having 2 or less carbon atoms, or substituted with only a functional group having 2 or less carbon atoms and a hydrocarbon group having 2 or less carbon atoms.

Repeating Unit (A1)

The repeating unit (A1) is a repeating unit derived from a norbornene compound monomer consisting of carbon atoms and hydrogen atoms where all the carbon atoms are involved in constitution of a condensed ring skeleton.

Examples of the repeating unit (A1) include a repeating unit represented by the general formula (1):

[General formula 1]

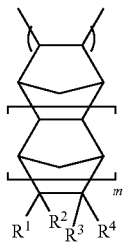

(1)

In the general formula (1), $R^1$ to $R^4$ each represent a hydrogen atom or a hydrocarbon group having from 1 to 20 carbon atoms, and in the case where these groups each represent a hydrocarbon group having from 1 to 20 carbon atoms, they are bonded to each other to form a cyclic structure having no substituent. m represents an integer of from 0 to 2.

Specific examples of the cyclic structure include a ring, such as a cyclopentane ring, a cyclopentene ring, a cyclohexane ring, a cyclohexene ring, a benzene ring, a cyclooctane ring, a cyclooctene ring and a norbornane ring, and a polycyclic structure composed of a plurality of these rings condensed.

The repeating unit (A1) can be obtained by addition polymerization of a norbornene compound (a1) represented by the general formula (2):

[General formula 2]

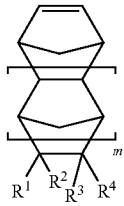

(2)

$R^1$ to $R^4$ and m have the same meanings as in the general formula (1).

Specific examples of the norbornene compound (a1) include 2-norbornene, dicyclopentadiene, tricyclo[5.2.1.0$^{2,6}$]dec-8-ene, tricyclo[6.2.1.0$^{2,7}$]undec-9-ene, tricyclo[6.2.1.0$^{2,7}$]undeca-4,9-diene, tricyclo[8.2.1.0$^{2,9}$]tridec-11-ene, tricyclo[8.2.1.0$^{2,9}$]trideca-5,11-diene, tetracyclo[6.2.1.1$^{3,6}$.0$^{2,7}$]dodec-4-ene, tetracyclo[9.2.1.0$^{2,10}$.0$^{3,8}$]tetradeca-3,5,7,12-tetraene (which may be referred to as 1,4-methano-1,4,4a,9a-tetrahydro-9H-fluorene in some cases), tetracyclo[10.2.1.0$^{2,11}$.0$^{4,9}$]pentadeca-4,6,8,13-tetraene (which may be referred to as 1,4-methano-1,4,4a,9,9a,10-hexahydroanthracene in some cases), pentacyclo[9.2.1.1$^{3,9}$.0$^{2,10}$]pentadec-12-ene, pentacyclo[9.2.1.1$^{3,9}$.0$^{2,10}$]pentadeca-5,12-diene and pentacyclo[9.2.1.1$^{4,7}$.0$^{2,10}$]pentadec-12-ene.

Among these, a norbornene compound monomer having no other unsaturated bond than the norbornene ring is preferred from the standpoint of the balance among heat resistance, low water absorption properties and a low linear expansion coefficient. Specific examples thereof include 2-norbornene, tricyclo[5.2.1.0$^{2,6}$]dec-8-ene, tricyclo[6.2.1.0$^{2,7}$]undec-9-ene, tricyclo[8.2.1.0$^{2,9}$]tridec-11-ene, tetracyclo[6.2.1.1$^{3,6}$.0$^{2,7}$]dodec-4-ene, pentacyclo[9.2.1.1$^{3,9}$.0$^{2,10}$]pentadec-12-ene and pentacyclo[9.2.1.1$^{4,7}$.0$^{2,10}$]pentadec-12-ene. In particular, 2-norbornene and tetracyclo[6.2.1.1$^{3,6}$.0$^{2,7}$]dodec-4-ene are more preferred, and 2-norbornene is particularly preferred.

Repeating Unit (A2)

The repeating unit (A2) is a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a hydrocarbon group having 2 or less carbon atoms.

Examples of the repeating unit (A2) include a repeating unit represented by the general formula (3):

[General formula 3]

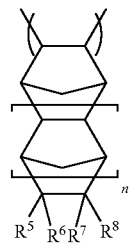

(3)

In the general formula (3), $R^5$ to $R^8$ each represent a hydrogen atom or a hydrocarbon group having from 1 or 2 carbon atoms, and not all $R^5$ to $R^8$ represent hydrogen atoms simultaneously. n represents an integer of from 0 to 2.

The repeating unit represented by the general formula (3) can be obtained by addition polymerization of a norbornene compound (a2) represented by the general formula (4):

[General formula 4]

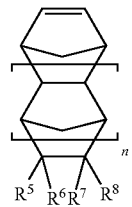

(4)

$R^5$ to $R^8$ and n have the same meanings as in the general formula (3).

Specific examples of the norbornene compound (a2) include norbornene compounds having an alkyl group having 2 or less carbon atoms, such as 5-methyl-2-norbornene, 5-ethyl-2-norbornene and 5,6-dimethyl-2-norbornene; norbornene compounds having an alkenyl group having 2 or less carbon atoms, such as 5-vinyl-2-norbornene; norbornene compounds having an alkylidene group having 2 or less carbon atoms, such as 5-methylidene-2-norbornene and 5-ethylidene-2-norbornene; tetracyclo[6.2.1.1$^{3,6}$.0$^{2,7}$]dodec-4-ene compounds having an alkyl group having 2 or less carbon atoms, such as 9-methyltetracyclo[6.2.1.1$^{3,6}$.0$^{2,7}$]dodec-4-ene, 9-ethyltetracyclo[6.2.1.1$^{3,6}$.0$^{2,7}$]dodec-4-ene and 9,10-dimethyltetracyclo[6.2.1.1$^{3,6}$.0$^{2,7}$]dodec-4-ene; tetracyclo[6.2.1.1$^{3,6}$.0$^{2,7}$]dodec-4-ene compounds having an alkenyl group having 2 or less carbon atoms, such as 9-vinyltetracyclo[6.2.1.1$^{3,6}$.0$^{2,7}$]dodec-4-ene; tetracyclo[6.2.1.1$^{3,6}$.0$^{2,7}$] dodec-4-ene compounds having an alkylidene group having 2 or less carbon atoms, such as 9-methylidenetetracyclo [6.2.1.1$^{3,6}$.0$^{2,7}$]dodec-4-ene and 9-ethylidenetetracyclo [6.2.1.1$^{3,6}$.0$^{2,7}$]dodec-4-ene; and the like.

Among these, a norbornene compound having, as a hydrocarbon group having 2 or less carbon atoms, an alkyl group is preferred, and a norbornene compound having an alkyl group having 2 or less carbon atoms and a tetracyclo[6.2.1.1$^{3,6}$. 0$^{2,7}$]dodec-4-ene compound having an alkyl group having 2 or less carbon atoms are particularly preferred, owing to excellent balance among heat resistance, low water absorption properties and low linear expansion coefficient.

Repeating Unit (B)

The repeating unit (B) is a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a functional group having 2 or less carbon atoms, or substituted with only a functional group having 2 or less carbon atoms and a hydrocarbon group having 2 or less carbon atoms.

The functional group having 2 or less carbon atoms is a concept that includes a functional group having 2 or less carbon atoms in the functional group itself, and also includes a group having a structure where a hydrogen atom of a hydrocarbon group having 2 or less carbon atoms is substituted with a functional group having 2 or less carbon atoms by itself with the total carbon number thereof being 2 or less as well as a group having a structure where a hydrogen atom of a functional group having 2 or less carbon atoms by itself is substituted with a hydrocarbon group having 2 or less carbon atoms with the total carbon number thereof being 2 or less.

Examples of the repeating unit (B) include a repeating unit represented by the general formula (5):

[General formula 5]

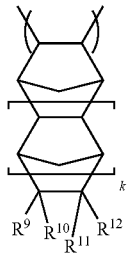

(5)

In the general formula (5), R$^9$ to R$^{12}$ each represent a hydrogen atom, a functional group having 2 or less carbon atoms or a hydrocarbon group having 1 or 2 carbon atoms, and at least one of R$^9$ to R$^{12}$ is a functional group having 1 or 2 carbon atoms. k represents an integer of from 0 to 2.

Specific examples of the hydrocarbon group having 1 or 2 carbon atoms include a methyl group, an ethyl group, a methylidene group, an ethylidene group, a vinyl group and a vinylidene group.

Specific examples of the functional group having 2 or less carbon atoms include a hydroxy group, a mercapto group, an amino group, a methoxy group, an ethoxy group, a methoxycarbonyl group, an acetoxy group, an epoxyethyl group, an acetyl group, a cyano group, a hydroxymethyl group, a hydroxyethyl group, an N-methylamino group, an N-ethylamino group, an N,N-dimethylamino group, a methylthio group and an ethylthio group.

The repeating unit (B) can be obtained by addition polymerization of a norbornene compound (b) represented by the general formula (6):

[General formula 6]

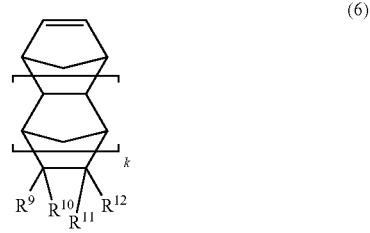

(6)

R$^9$ to R$^{12}$ and k have the same meanings as in the general formula (5).

Specific examples of the norbornene compound (b) include norbornene compounds having an alkoxy group having 2 or less carbon atoms, such as 5-methoxy-2-norbornene, 5-ethoxy-2-norbornene and 5,6-dimethoxy-2-norbornene; norbornene compounds having a methoxycarbonyl group, such as 5-methoxycarbonyl-2-norbornene and 5-methyl-5-methoxycarbonyl-2-norbornene; norbornene compounds having an acetoxy group, such as 5-acetoxy-2-norbornene; norbornene compounds having an epoxyethyl group, such as 5-epoxyethyl-2-norbornene; a norbornene compound having an acetyl group, such as 5-acetyl-2-norbornene; norbornene compounds having a cyano group, such as 5-cyano-2-norbornene and 5-methyl-5-cyano-2-norbornene; norbornene compounds having an N,N-dimethylamino group, such as 5-(N,N-dimethylamino)-2-norbornene; norbornene compounds having an alkylthio group having 2 or less carbon atoms, such as 5-methylthio-2-norbornene and 5-ethylthio-2-norbornene; tetracyclo[6.2.1.1$^{3,6}$.0$^{2,7}$]dodec-4-ene compounds having an alkoxy group having 2 or less carbon atoms, such as 9-methoxytetracyclo[6.2.1.1$^{3,6}$.0$^{2,7}$]dodec-4-ene, 9-ethoxytetracyclo[6.2.1.1$^{3,6}$.0$^{2,7}$]dodec-4-ene and 9,10-dimethoxytetracyclo[6.2.1.1$^{3,6}$.0$^{2,7}$]dodec-4-ene; tetracyclo [6.2.1.1$^{3,6}$.0$^{2,7}$]dodec-4-ene compounds having a methoxycarbonyl group, such as 9-methoxycarbonyltetracyclo [6.2.1.1$^{3,6}$.0$^{2,7}$]dodec-4-ene and 9-methyl-9-methoxycarbonyl-tetracyclo[6.2.1.1$^{3,6}$.0$^{2,7}$]dodec-4-ene; tetracyclo[6.2.1.1$^{3,6}$.0$^{2,7}$]dodec-4-ene compounds having an acetoxy group, such as 9-acetoxytetracyclo[6.2.1.1$^{3,6}$.0$^{2,7}$] dodec-4-ene; tetracyclo[6.2.1.1$^{3,6}$.0$^{2,7}$]dodec-4-ene compounds having an epoxyethyl group, such as 9-epoxyethyltetracyclo[6.2.1.1$^{3,6}$.0$^{2,7}$]dodec-4-ene; tetracyclo[6.2.1.1$^{3,6}$. 0$^{2,7}$]dodec-4-ene compounds having an acetyl group, such as 9-acetyltetracyclo[6.2.1.1$^{3,6}$.0$^{2,7}$]dodec-4-ene; tetracyclo [6.2.1.1$^{3,6}$.0$^{2,7}$]dodec-4-ene compounds having a cyano group, such as 9-cyanotetracyclo[6.2.1.1$^{3,6}$.0$^{2,7}$]dodec-4-ene and 9-methyl-9-cyanotetracyclo[6.2.1.1$^{3,6}$.0$^{2,7}$]dodec-4-ene; tetracyclo[6.2.1.1$^{3,6}$.0$^{2,7}$]dodec-4-ene compounds having an N,N-dimethylamino group, such as 9-(N,N-dimethylamino)-tetracyclo[6.2.1.1$^{3,6}$.0$^{2,7}$]dodec-4-ene; tetracyclo[6.2.1. 1$^{3,6}$.0$^{2,7}$]dodec-4-ene compounds having an alkylthio group having 2 or less carbon atoms, such as 9-methylthiotetracyclo [6.2.1.1$^{3,6}$.0$^{2,7}$]dodec-4-ene and 9-ethylthiotetracyclo [6.2.1.1$^{3,6}$.0$^{2,7}$]dodec-4-ene; and the like.

In the invention, the carbon number of the functional group in the repeating unit (B) is necessarily 2 or less.

The use of a polymer having a repeating unit of a norbornene compound monomer having a functional group having a carbon number exceeding 2 (for example, a triethoxysilyl group) as a substituent increases the water absorption ratio and the linear expansion coefficient.

In the norbornene compound addition polymers (I) and (II) constituting the film of the invention, the sum of the repeating unit (A1) and the repeating unit (A2) is necessarily 70% by mol or more, preferably 75% by mol or more, and more preferably 80% by mol or more, based on the total repeating units. When the sum is in the aforementioned range, the norbornene compound addition polymers are excellent in solubility in a common solvent and provide a film having a low water absorption ratio and a low linear expansion coefficient.

In the norbornene compound addition polymers (I) and (II) of the invention, the ratio of the repeating unit (B) is necessarily 30% by mol or less, preferably 25% by mol or less, and more preferably 20% by mol or less, based on the total repeating units. When the ratio exceeds the aforementioned range, the water absorption ratio is undesirably increased.

In the norbornene compound addition polymer (I) constituting the film of the invention, the ratio, [{(A1)+(A2)}/(B)], of the total molar number of the molar number of the repeating unit (A1) and the molar number of the repeating unit (A2) to the molar number of the repeating unit (B) is necessarily in a range of from 70/30 to 100/0, preferably from 80/20 to 100/0, and more preferably from 90/10 to 100/0. In the case where [{(A1)+(A2)}/(B)] is lower than the range, the water absorption ratio is increased.

In the norbornene compound addition polymer (I), the ratio, [(A1)/(A2)], of the molar number of the repeating unit (A1) to the molar number of the repeating unit (A2) is necessarily in a range of from 10/90 to 98/2, preferably in a range of from 15/85 to 98/2, more preferably in a range of from 15/85 to 95/5, and particularly preferably in a range of from 20/80 to 90/10. In the case where [(A1)/(A2)] is lower than the range, the linear expansion coefficient is increased, and in the case where it exceeds the range, on the other hand, the solubility is deteriorated.

In the norbornene compound addition polymer (II) constituting the film of the invention, the ratio, [(A1)/(B)], of the molar number of the repeating unit (A1) to the molar number of the repeating unit (B) is necessarily in a range of from 70/30 to 98/2, preferably from 75/25 to 98/2, and particularly preferably from 80/20 to 98/2. In the case where [(A1)/(B)] is lower than the range, the water absorption ratio is increased, and in the case where it exceeds the range, on the other hand, the solubility is deteriorated and the linear expansion coefficient is increased.

The norbornene compound addition polymer (I) has a weight average molecular weight (Mw) of from 50,000 to 1,000,000 in terms of standard polystyrene measured by gel permeation chromatography. The weight average molecular weight of the norbornene compound addition polymer (I) is preferably from 70,000 to 800,000, more preferably from 300,000 to 700,000, and particularly preferably from 350,000 to 650,000. The number average molecular weight (Mn) thereof is preferably from 10,000 to 600,000, more preferably from 50,000 to 400,000, further preferably from 80,000 to 350,000, and particularly preferably 100,000 to 300,000.

The norbornene compound addition polymer (II) has a weight average molecular weight (Mw) of from 300,000 to 700,000 in terms of standard polystyrene, and the number average molecular weight thereof is from 80,000 to 350,000. The weight average molecular weight of the norbornene compound addition polymer (II) is preferably from 350,000 to 650,000. The number average molecular weight thereof is preferably from 100,000 to 300,000.

In the case where the weight average molecular weight and/or the number average molecular weight exceed the upper limits, the viscosity of the solution gets too high to handle, or the film is not soluble in a solvent. In the case where the weight average molecular weight and/or the number average molecular weight are lower than the lower limits, the mechanical properties of the film are deteriorated, or cracks are liable to appear.

In the case where the film of the invention comprises the repeating unit (A2), there is a tendency that cracks hardly appear even when the weight average molecular weight and/or the number average molecular weight are low.

The film of the invention preferably has a linear expansion coefficient of 75 ppm/° C. or less, more preferably 73 ppm/° C. or less, further preferably 70 ppm/° C. or less, particularly preferably 68 ppm/° C. or less, and especially preferably 65 ppm/° C. or less.

The film of the invention preferably has a water absorption ratio of 0.1% by weight or less, more preferably 0.08% by weight or less, further preferably 0.06% by weight or less, and particularly preferably 0.02% by weight or less.

The norbornene compound addition polymers (I) and (II) used in the invention are excellent in solubility in a common solvent. For example, it is soluble in an aromatic hydrocarbon, such as toluene or xylene; an alicyclic hydrocarbon, such as cyclohexane or decalin; a halogenated hydrocarbon, such as chloroform or chlorobenzene; or the like.

Accordingly, the film can be easily formed from a solution of the norbornene compound addition polymers (I) and (II) in such a solvent.

The glass transition temperature of the film of the invention is preferably 250° C. or higher, and particularly preferably 280° C. or higher, from the standpoint of heat resistance.

The glass transition temperature of the film of the invention is preferably 400° C. or lower, and particularly preferably 350° C. or lower. Too high a glass transition temperature makes it difficult to manufacture the norbornene compound addition polymer constituting the film in some cases.

Production of Norbornene Compound Addition Polymer

For obtaining the norbornene compound addition polymers (I) and (II) used in the invention, a norbornene compound monomer mixture containing the norbornene compound (a1) represented by the general formula (2) as an essential component, the norbornene compound (a2) represented by the general formula (4) and/or the norbornene compound (b) represented by the general formula (6) is addition-polymerized in the presence of a polymerization catalyst.

The polymerization catalyst for obtaining the norbornene compound addition polymers (I) and (II) used in the invention is not particularly limited.

Specific preferred examples thereof include a polymerization catalyst containing a Group 10 transition metal catalyst, for example, a polymerization catalyst disclosed in JP-T-11-505880, such as hexafluorophosphate; a polymerization catalyst disclosed in WO 2000/20472, such as (allyl)palladium chloride dimer/tricyclohexylphosphine/lithium tetrakis(pentafluorophenyl)borate 2.5 ether; a polymerization catalyst disclosed in JP-A-2001-098035, such as (phenyl)palladium bis(triphenylphosphine) iodide/methylaluminoxane; and the like.

The norbornene compound addition polymers (I) and (II) obtained in the aforementioned manner may contain an olefinic unsaturated bond in some cases, and those having the olefinic unsaturated bond thereof hydrogenated may also be preferably used.

The hydrogenation reaction may be carried out in a known method, i.e., by bringing the polymers into contact with hydrogen in the presence of a hydrogenation catalyst.

Examples of the hydrogenation catalyst used include a solid catalyst comprising a Group 8 to 10 transition metal, such as nickel, palladium, platinum, cobalt, ruthenium or rhodium, or a compound thereof, supported on a porous carrier, such as carbon, alumina, silica, silica-alumina or diatomaceous earth; a combination of an organic carboxylate salt of a Group 4 to 10 metal, such as cobalt, nickel or palladium, a β-diketone compound, and an organoaluminum or an organolithium; a homogeneous catalyst such as a complex of ruthenium, rhodium, iridium or the like; and the like.

After the completion of the addition polymerization reaction and/or the hydrogenation reaction, the catalyst is preferably removed.

Examples of the method for removing the catalyst include a method by removal by adsorption with an adsorbent, such as silica, alumina or activated carbon; a method by removal with an ion-exchangeable resin; a method by filtration after insolubilization of the catalyst residue by addition of a chelating agent; a method by coagulation by addition of the polymer solution into a large amount of a poor solvent, such as methanol or acetone; and the like.

The norbornene compound addition polymers (I) and (II) can be recovered by a known method after completing the addition polymerization reaction, such as a method of removing the solvent directly from the polymer solution, a method of separating the polymers after coagulating with the aforementioned poor solvent, such as methanol, or the like. The solution after completing the polymerization reaction or the solution after removing the catalyst may be used as it is for cast molding to produce a molded article.

Film Comprising Norbornene Compound Addition Polymer

The film of the invention may be applied to an optical part, an electric insulating part, an electric or electronic part, an electronic part-sealing material, medical equipment, a packaging material, and the like.

The film of the invention may be comprised of only the norbornene compound addition polymer (I) and/or (II) or may be comprised of a mixture of the norbornene compound addition polymer (I) and/or (II) with other transparent resin (for example, a cycloolefin addition polymer, a hydrogenated cycloolefin-ring-opening polymer, an addition copolymer of an α-olefin and a cycloolefin, a crystalline α-olefin polymer, a rubber-like copolymer of ethylene and an α-olefin having 3 or more carbon atoms, a hydrogenated butadiene polymer, a hydrogenated butadiene-styrene block copolymer, a hydrogenated isoprene polymer and the like) at an arbitrary ratio.

Upon molding the film of the invention from the norbornene compound addition polymer (I) and/or (II), various kinds of additives may be added depending on necessity.

Examples of the additives include a filler, an antioxidant, a fluorescent material, an ultraviolet ray absorber, an antistatic agent, a light stabilizer, a near infrared ray absorber, a colorant such as a dye or a pigment, a lubricant, a plasticizer, a flame retardant, a crosslinking agent, and the like.

Examples of the filler include an oxide of a metal such as silicon, titanium, aluminum, zirconium or the like.

Examples of the antioxidant include a phenolic antioxidant, a lactone antioxidant, a phosphorous antioxidant, a thioether antioxidant and the like.

The fluorescent material, which is excited when irradiated with light and emits light having a wavelength longer than the excitation wavelength, is used, for example, in the case where an optical device is sealed, for emission of light having a wavelength within the visible region when irradiated with light, emitted by the optical device, having a wavelength in a range of from the blue region to the ultraviolet region.

The method for adding these additives is not particularly limited.

The film of the invention comprising the norbornene compound addition polymer can be obtained by a known molding method.

The norbornene compound addition polymer (I) and/or (II) used in the invention is easily soluble in an organic solvent. Accordingly, an organic solvent solution thereof may be applied or solution-cast on a steel belt, a carrier film or the like, followed by drying, to provide a film.

A woven cloth or nonwoven cloth, such as glass cloth, may be impregnated with the organic solvent solution of the norbornene compound addition polymer (I) and/or (II) used in the invention, and then dried to provide a film containing the woven cloth or nonwoven cloth.

The norbornene compound addition polymer (I) and/or (II) used in the invention may be swelled with an organic solvent, and then the polymers may be formed and fabricated into a film while evaporating the solvent with an extruder.

An organic solvent solution of the norbornene compound addition polymer (I) and/or (II) used in the invention may be cast into a mold, followed by evaporation of the solvent, to be formed. Furthermore, the organic solvent solution may be attached to a specific part or substrate, followed evaporating the solvent, to be formed.

Moreover, the norbornene compound addition polymer (I) and/or (II) used in the invention may be mixed with another thermoplastic resin to provide a polymer blend composition, which may be formed into a film by a melt-extrusion method using a melt-extruder or the like.

The thickness of the film may be selected depending on purposes and is generally from 1 to 1,000 μm, and preferably from 2 to 500 μm. In the case where the thickness of the film falls within the range, the period of time required for forming the film is short, and the resulting film is excellent in strength.

The film of the invention comprised of the norbornene compound addition polymer (I) and/or (II) has a total light transmittance of 70% or more, preferably 80% or more, and more preferably 85% or more, and thus can be favorably used as an optical material and a member for a display device.

Transparent Electroconductive Film-Laminated Film

The film of the invention comprising the norbornene compound addition polymer (I) and/or (II) may be laminated with a transparent electroconductive film (which may be referred to as "a transparent electroconductive film-laminated film" in some cases).

Specifically, a transparent electroconductive film is laminated by using an inorganic material such as an inorganic oxide, an inorganic nitride or an inorganic sulfide (for example, indium tin oxide (ITO), aluminum oxide, silicon oxide, titanium oxide, zinc oxide, tungsten oxide, aluminum nitride, silicon nitride, titanium nitride, cadmium sulfide, zinc sulfide and zinc selenide) by a vacuum film forming method (for example, a sputtering method, a vapor deposition method and a CVD method) and other methods.

The thickness of the transparent electroconductive film can be appropriately selected from a range of from 50 to 4,000 Å.

The transparent electroconductive film-laminated film of the invention has a total light transmittance of 70% or more, preferably 80% or more, and more preferably 85% or more, and thus can be favorably used as an optical material and a member for a display device.

In the transparent electroconductive film-laminated film of the invention, an adhesive layer may be provided between the film comprised of the norbornene compound addition polymer (I) and/or (II) and the transparent electroconductive film for the purpose of enhancing the smoothness of the film and the adhesiveness thereof to the transparent electroconductive film. The adhesive layer can be obtained by applying resin varnish, followed by removing the solvent by drying. At this time, varnish containing a resin capable of forming a film after removing the solvent, i.e., a solid resin, is preferably used from the standpoint of uniform coating. Specific examples of the resin therefor include a photo-curable resin, such as an acrylic prepolymer, e.g., epoxy diacrylate, urethane diacrylate and polyester diacrylate; a thermosetting resin, such as an epoxy-based, e.g., an o-cresol novolac type and a bisphenol type, a urethane-based, an acrylate-based, a urea-based, a melamine-based or an unsaturated polyester-based thermosetting resin; an electron beam-curable resin; and the like. Among these, a photo-curable resin is preferred from the standpoint of productivity and cost.

Examples of the method for forming the cured resin film include a gravure coating method, a reverse roll coating method, a kiss roll coating method and the like, any of which may be used.

The transparent electroconductive film-laminated film of the invention may have a gas barrier layer on the opposite side to the transparent electroconductive film. The gas barrier layer may be formed of an inorganic material or an organic material. Examples of the usable inorganic material include silicon oxide, aluminum oxide, indium oxide and the like, and examples of the usable organic material include polyvinyl alcohol, an ethylene/vinyl alcohol copolymer, polyamide and the like.

The thickness of the gas barrier layer is preferably from 100 to 2,000 Å for the inorganic material and from 500 to 10,000 Å for the organic material.

The inorganic material can be formed into a film by a known method, such as a sputtering method, an ion plating method, a resistance heating method, a CVD method or the like. In the case of the organic material, a film can be formed by dissolving the material in a solvent and applying it by the coating method mentioned above, followed by drying.

An adhesive layer may be provided between the film and the gas barrier layer.

A protective coating layer may be further provided on the gas barrier layer for protecting the same. The protective coating layer is preferably formed in the same manner as the adhesive layer.

Color Filter

A color filter can be obtained by laminating a color filter layer on a substrate for a color filter comprised of the film of the invention or the transparent electroconductive film-laminated film of the invention. The laminating method includes known methods such as a pigment dispersion method, a dyeing method, an electrodeposition method, a printing method, a transferring method and the like.

In the pigment dispersion method, for example, a black matrix is formed, on a substrate for a color filter, with a metallic light shielding film of a chromium compound such as metallic chromium, chromium oxide or chromium nitride, a nickel-tungsten alloy or the like, by a sputtering method or a vacuum deposition method, and then a photosensitive resin composition having a red pigment dispersed therein (color resist) is coated on the entire surface thereof by a spin coating method, a wire bar coating method, a flow coating method, a die coating method, a roll coating method, a spray coating method or the like, and is then exposed to light through a mask and subsequently developed to form red pixels. Blue and green pixels are formed by coating, exposure to light and development in the same manner. Thus, pixels of three colors are formed. The order of the formation of pixels of three colors is not particularly determined and may be arbitrarily selected. In the case where the black matrix portion among the pixels remains as dents, a protective film may be formed with a transparent resin such as an epoxy resin or an acrylic resin for smoothening by covering the surface. The pigment dispersion method may be employed also for forming the black matrix. Specifically, a photosensitive resin having a black pigment dispersed therein (black resist) may be coated, exposed to light and developed.

As the constitutional components of the color resists and the black resist and the coating, exposing and developing methods therefor, the constitutional components and the methods disclosed, for example, in JP-A-2004-56151, JP-A-2004-347831 and the like may be employed. As for the printing method, known methods may be used, and for example, the inks and the printing methods disclosed in JP-A-6-347637, JP-A-11-326622 and JP-A-2004-333971 may be used.

The film of the invention has high resistance to chemicals, such as a resist, ink or a developer solution, and thus the substrate does not suffer from deformation or cracks in the color filter laminating step.

The substrate for a color filter or for the black matrix may be subjected to a corona discharge treatment, an ozone treatment, a thin film formation treatment with a silane coupling agent or various resins such as a urethane resin, for the purpose of improving the surface property such as adhesiveness and the like, depending on necessity. In the case where the thin film formation treatment with various resins is carried out, the thickness thereof is generally in a range of from 0.01 to 10 µm, and preferably in a range of from 0.05 to 5 µm.

The color filter can be used as a color filter of a liquid crystal display device, and also can be used as a part of members of a color display, a liquid crystal display device and the like.

Optical Part

In addition to a substrate for a color filter, the film of the invention can be favorably used as an optical part such as a light guide plate, a protective film, a polarizing film, a phase retardation film, a touch-sensitive panel, a substrate for a transparent electrode, a substrate for an optical recording medium such as CD, MD or DVD, a substrate for a TFT device, a substrate for a liquid crystal display device, a substrate for an organic EL display device, a light wave guide for optical communication, an optical lens, or a sealant.

Among these, the film can be favorably used as a member for a display device, specifically a substrate for a color filter, a light guide plate, a protective film, a polarizing film, a phase retardation film, a touch-sensitive panel, a substrate for a transparent electrode, a substrate for a TFT device, a substrate for a liquid crystal display device, a substrate for an organic EL display device and the like.

In addition to an optical part, the film of the invention can be used as an electric insulating part, an electric or electronic part, a sealant for an electronic part, medical equipment and a packaging material.

Electric Insulating Part

The film of the invention is not thermally deformed in a soldering step and is not deteriorated in mechanical properties due to heat deterioration, owing to excellent heat resistance and a small linear expansion coefficient, and therefore, it is most suitable as an electric insulating part.

Examples of the electric insulating part include a covering material of a wire and a cable, an insulating material for office automation equipment such as a computer, a printer or a duplicator, an insulating part for a flexible printed circuit board, and the like. In particular, the film is favorably used as a flexible printed circuit board.

Electric or Electronic Part

As the electric or electronic part, the film is used as a container, a tray, a carrier tape, a separation film, a rinsing vessel, a pipe, a tube and the like, and also as a sealant for a semiconductor device and an optical device (such as a light emitting diode), a sealant and an overcoating material for an integrated circuit, and the like.

Sealant for Electronic Part

The film of the invention has a low water absorption ratio and is excellent in heat resistance, transparency and electric properties, and thus is useful as a sealant for an electronic part. Examples of the electronic part include a part of an integrated circuit including a semiconductor chip such as CPU or DRAM; a semiconductor part such as a diode, a transistor or a light emitting device (such as LED); and an ordinary electronic part such as a resistor, a capacitor, an inductor, a ceramic filter or a thermistor. Among these, the film is preferred as a sealant for an LED device such as a blue LED device, an ultraviolet LED device or a white LED device, and in particular, as a sealant for a surface-mounting type LED of these devices.

An electronic part can be sealed by attaching a solution of the norbornene compound addition polymer (I) and/or (II) used in the invention in an organic solvent to an electronic part to be sealed, followed by removing the solvent through evaporation. At this time, a transfer molding method, a potting method, a coating method or the like, as a conventional sealing method, may be employed. In the case of a transfer molding method, a solid content of the norbornene compound addition polymer containing a small amount of an organic solvent is softened by heating, and then molded by injecting into a mold having an electronic member mounted thereto, followed by removing the small amount of the solvent through evaporation. In the case of a potting method, an electronic member to be sealed is filled with a solution of the norbornene compound addition polymer (I) and/or (II) having a high viscosity, followed by drying. In the case of a coating method, a solution of the norbornene compound addition polymer (I) and/or (II) is applied on an electronic part to be sealed, particularly an electronic substrate or the like, by such a method as a roll coating method, a curtain coating method, a screen printing method, a spin coating method or a dipping method, followed by removing the solvent through evaporation.

Medical Equipment

As medical equipment, the film is used as a container for a medicine, an ampoule, a syringe, a bag for an infusion solution, a sample container, a test tube, a blood sampling tube, a sterile container, a pipe, a tube and the like.

EXAMPLE

The invention is described more specifically with reference to examples and comparative examples below. The invention is not limited to the examples. All parts and percents in the examples are in weight basis unless otherwise indicated.

The tests and evaluations in the examples and comparative examples were carried out in the following manners.

(1) Weight Average Molecular Weight (Mw) and Number Average Molecular Weight (Mn) of Polymer They are measured as polystyrene-equivalent values by gel permeation chromatography (GPC) with tetrahydrofuran or chloroform as a solvent.

(2) Copolymerization Ratio of Polymer

It is obtained by $^1$H-NMR measurement.

(3) Water Absorption Ratio

It is obtained from change in weight after immersing a piece of the film in water at 23° C. for 24 hours. (In Tables 1 and 2, "<0.01" means a water absorption ratio of less than 0.01%).

(4) Glass Transition Temperature (Tg)

It is measured as an inflexion point temperature of the storage elastic modulus E' measured by dynamic viscoelasticity measurement. For measuring the dynamic viscoelasticity, the inflexion point temperature of the storage elastic modulus E' is measured with DMS6100 (produced by Seiko Instruments Inc.) under conditions of a measuring frequency of 10 Hz, a temperature increasing rate of 5° C. per minute, a vibration mode of a single waveform, and a vibration amplitude of 5.0 µm.

(5) Linear Expansion Coefficient

With TMA (thermal mechanical analysis)/SDTA840 (produced by Mettler-Toledo Co., Ltd.), a piece of the film having a thickness of about 100 µm, a length of 15.4 mm and a width of 5.95 mm is fixed vertically and applied with a load of 1 g with a probe. For removing the thermal history of the film, the temperature is once raised from room temperature to 300° C. at a rate of 5° C. per minute, and then decreased to room temperature. The temperature is again raised from room temperature at a rate of 5° C. per minutes, and the linear expansion coefficient is obtained from the gradient of the elongation of the film piece within a range of from 30 to 250° C.

(6) Total Light Transmittance

It is measured for the film having a thickness of 100 µm by using an ultraviolet/visible spectrometer ("V-550", a trade name, produced by JASCO Corp.) within a wavelength range of from 400 to 700 nm.

(7) Film Strength (Occurring of Cracking on Folding)

A film having a thickness of 100 µm prepared from a toluene solution is folded at the center to be overlapped, and the film strength is evaluated by the occurrence or not of cracking at the folded part.

Example 1

Synthesis of Norbornene Compound Addition Polymer (P1)

0.77 part of (allyl)palladium(tricyclohexylphosphine) chloride and 1.14 parts of lithium tetrakis(pentafluorophenyl) borate were placed in a glass reactor having been substituted with nitrogen, and subsequently, 2 parts of toluene were added thereto to prepare a catalyst liquid.

1,650 parts of 2-norbornene (NB; molecular weight: 94), 300 parts of 5-acetoxy-2-norbornene (NBOAc; molecular weight: 152), 405 parts of styrene as a molecular weight modifier and 7,200 parts of toluene as a polymerization solvent were charged in a pressure-proof glass reactor equipped with a stirrer having been substituted with nitrogen, to which the catalyst liquid was added to initiate polymerization. After reacting at 60° C. for 1.5 hours, the polymerization reaction liquid was poured in a large amount of methanol to deposit the polymer completely, which was then filtered, washed and dried under reduced pressure at 50° C. for 18 hours to provide 1,550 parts of a copolymer (P1).

The resulting copolymer (P1) was soluble in toluene, chloroform and the like. The copolymer (P1) had a number average molecular weight (which may be abbreviated as "Mn" in some cases) of 157,000 and a weight average molecular weight (which may be abbreviated as "Mw" in some cases) of 403,000, and the compositional ratio of NB units (repeating unit (A1))/NBOAc units (repeating unit (B)) of the copolymer (P1) was 95/5 (mol/mol). Accordingly, the copolymer corresponded to the norbornene compound addition polymer (II), as the ratio, [(A1)/(B)], of the molar number of the repeating unit (A1) to the molar number of the repeating unit (B) was 95/5 (mol/mol).

The evaluation results of properties of the copolymer (P1) are shown in Table 1.

A toluene solution of the copolymer (P1) of 10% by weight was prepared and cast on a flat polytetrafluoroethylene sheet, followed by removing toluene through evaporation at room temperature for 24 hours under an air stream, and then vacuum dried at 80° C. for 24 hours to provide a film having a thickness of 100 μm.

The measurement results of glass transition temperature, water absorption ratio and linear expansion coefficient of a piece of the resulting film are shown in Table 1.

Example 2

Synthesis of Norbornene Compound Addition Polymer (P2)

1,650 parts of 2-norbornene (NB; molecular weight: 94), 688 parts of 9-methoxycarbonyltetracyclo[6.2.1.1$^{3,6}$.0$^{2,7}$]dodec-4-ene (TCDMA; molecular weight: 218), 430 parts of styrene as a molecular weight modifier and 7,200 parts of toluene as a polymerization solvent were charged in a pressure-proof glass reactor equipped with a stirrer having been substituted with nitrogen, to which the same catalyst liquid as used in Example 1 was added to initiate polymerization. After reacting at 60° C. for 2.5 hours, the polymerization reaction liquid was poured in a large amount of methanol to deposit the polymer completely, which was then filtered, washed and dried under reduced pressure at 50° C. for 18 hours to provide 2,100 parts of a copolymer (P2).

The resulting copolymer (P2) was soluble in toluene, chloroform and the like. The copolymer (P2) had Mn of 217,000 and Mw of 564,000, and the compositional ratio of NB units (repeating unit (A1))/TCDMA units (repeating unit (B)) of the copolymer (P2) was 85/15 (mol/mol). Accordingly, the copolymer corresponded to the norbornene compound addition polymer (II), as the ratio, [(A1)/(B)], of the molar number of the repeating unit (A1) to the molar number of the repeating unit (B) was 85/15 (mol/mol).

The evaluation results of properties of the copolymer (P2) are shown in Table 1.

A film having a thickness of 100 μm was obtained from the copolymer (P2) in the same manner as in Example 1.

The measurement results of glass transition temperature, water absorption ratio and linear expansion coefficient of a piece of the resulting film are shown in Table 1.

Example 3

Synthesis of Norbornene Compound Addition Polymer (P3)

1,780 parts of a copolymer (P3) was obtained in the same manner as in Example 1 except that 324 parts of 5-methyl-5-methoxycarbonyl-2-norbornene (NBMMA; molecular weight: 166) was used instead of 300 parts of 5-acetoxy-2-norbornene (NBOAc; molecular weight: 152).

The resulting copolymer (P3) was soluble in toluene, chloroform and the like. The copolymer (P3) had Mn of 192,000 and Mw of 504,000, and the compositional ratio of NB units (repeating unit (A1))/NBMAA units (repeating unit (B)) of the copolymer (P3) was 92/8 (mol/mol). Accordingly, the copolymer corresponded to the norbornene compound addition polymer (II), as the ratio, [(A1)/(B)], of the molar number of the repeating unit (A1) to the molar number of the repeating unit (B) was 92/8 (mol/mol).

The evaluation results of properties of the copolymer (P3) are shown in Table 1.

A film having a thickness of 100 μm was obtained from the copolymer (P3) in the same manner as in Example 1.

The measurement results of glass transition temperature, water absorption ratio and linear expansion coefficient of a piece of the resulting film are shown in Table 1.

Example 4

Synthesis of Norbornene Compound Addition Polymer (P4)

1,200 parts of 2-norbornene (NB; molecular weight: 94), 1,160 parts of 1,4-methano-1,4,4a,9a-tetrahydro-9H-fluorene (MTHF; molecular weight: 182), 970 parts of 5-methoxycarbonyl-2-norbornene (MCNB; molecular weight: 152), 521 parts of styrene as a molecular weight modifier and 7,700 parts of toluene as a polymerization solvent were charged in a pressure-proof glass reactor equipped with a stirrer having been substituted with nitrogen, to which the same catalyst liquid as used in Example 1 was added to initiate polymerization. After reacting at 60° C. for 2 hours, the polymerization reaction liquid was poured in a large amount of methanol to deposit the polymer completely, which was then filtered, washed and dried under reduced pressure at 50° C. for 18 hours to provide 3,020 parts of a copolymer (P4).

The resulting copolymer (P4) was soluble in toluene, chloroform and the like. The copolymer (P4) had Mn of 179,000 and Mw of 409,000, and the compositional ratio of NB units (repeating unit (A1))/MTHF units (repeating unit (A1))/MCNB units (repeating unit (B)) of the copolymer (P2) was 58/25/17 (mol/mol/mol). Accordingly, the copolymer corresponded to the norbornene compound addition polymer (II), as the ratio, [(A1)/(B)], of the molar number of the repeating unit (A1) to the molar number of the repeating unit (B) was 83/17 (mol/mol).

The evaluation results of properties of the copolymer (P4) are shown in Table 1.

A film having a thickness of 100 μm was obtained from the copolymer (P4) in the same manner as in Example 1.

The measurement results of glass transition temperature, water absorption ratio and linear expansion coefficient of a piece of the resulting film are shown in Table 1.

Comparative Example 1

Synthesis of Norbornene Compound Addition Polymer (PC1)

8.2 parts of N,N'-bis(2-methylphenyl)benzamidinate nickel (triphenylphosphine) chloride and 825 parts of a toluene solution of methylaluminoxane having an aluminum content of 9.0% were placed in a glass reactor having been substituted with nitrogen, and subsequently, 500 parts of toluene was added thereto to prepare a catalyst liquid.

2,360 parts of 2-norbornene and 4,000 parts of toluene as a polymerization solvent were charged in a pressure-proof glass reactor equipped with a stirrer having been substituted with nitrogen, to which the catalyst liquid was added to initiate polymerization. After reacting at 60° C. for 1 hour, a polymer was deposited, and the polymerization solution was solidified. The solidified polymerization reaction liquid was placed in a large amount of methanol, which was then finely pulverized, filtered, washed and dried under reduced pressure at 50° C. for 18 hours to provide 2,300 parts of a polymer (PC1). The resulting polymer (PC1) was insoluble in toluene, chloroform and the like, and the molecular weight thereof could not be measured. The evaluation results of properties of the polymer (PC1) are shown in Table 1.

A film could not be produced since the polymer (PC1) was insoluble in a solvent.

Comparative Example 2

Synthesis of Norbornene Compound Addition Polymer (PC2)

A norbornene compound was polymerized to obtain 360 parts of a copolymer (PC2) in the same manner as in Example 1 except that the amounts of the monomers were changed to 550 parts of 2-norbornene (NB; molecular weight: 94) and 900 parts of 5-acetoxy-2-norbornene (NBOAc; molecular weight: 152). The resulting copolymer (PC2) was soluble in toluene, chloroform and the like. The copolymer (PC2) had Mn of 86,000 and Mw of 255,000, and the compositional ratio of NB units (repeating unit (A1))/NBOAc units (repeating unit (B)) of the copolymer (PC2) was 66/34 (mol/mol). Accordingly, the ratio, [(A1)/(B)], of the molar number of the repeating unit (A1) to the molar number of the repeating unit (B) was 66/34 (mol/mol).

The evaluation results of properties of the copolymer (PC2) are shown in Table 1.

A film having a thickness of 100 μm was obtained from the copolymer (PC2) in the same manner as in Example 1.

The measurement results of glass transition temperature, water absorption ratio and linear expansion coefficient of a piece of the resulting film are shown in Table 1.

Comparative Example 3

Synthesis of Norbornene Compound Addition Polymer (PC3)

2,400 parts of 2-norbornene (NB; molecular weight: 94), 1,280 parts of 5-triethoxysilyl-2-norbornene (NBSET; molecular weight: 256), 521 parts of styrene as a molecular weight modifier and 8,600 parts of toluene as a polymerization solvent were charged in a pressure-proof glass reactor equipped with a stirrer having been substituted with nitrogen, to which the same catalyst liquid as used in Example 1 was added to initiate polymerization. After reacting at 60° C. for 3 hours, the polymerization reaction liquid was poured in a large amount of methanol to deposit the polymer completely, which was then filtered, washed and dried under reduced pressure at 50° C. for 18 hours to provide 3,100 parts of a copolymer (PC3).

The resulting copolymer (PC3) was soluble in toluene, chloroform and the like. The copolymer (PC3) had Mn of 211,000 and Mw of 514,000, and the compositional ratio of NB units (repeating unit (A1))/NBSET units (repeating unit other than repeating units (A1), (A2) and (B)) of the copolymer (PC3) was 85/15 (mol/mol). The ratio [(A1)/(B)] was 85/0 (mol/mol).

The evaluation results of properties of the copolymer (PC3) are shown in Table 1.

A film having a thickness of 100 μm was obtained from the copolymer (PC3) in the same manner as in Example 1.

The measurement results of glass transition temperature, water absorption ratio and linear expansion coefficient of a piece of the resulting film are shown in Table 1.

Comparative Example 4

Synthesis of Norbornene Compound Addition Polymer (PC4)

A norbornene compound was polymerized to give 1,900 parts of a copolymer (PC4) in the same manner as in Example 1 except that the amount of styrene was changed to 200 parts.

The resulting copolymer (PC4) was swelled with toluene and chloroform but was not completely dissolved therein. The soluble part of the copolymer (PC4) had Mn of 433,000 and Mw of 1,210,000, and the compositional ratio of NB units (repeating unit (A1))/NBOAc units (repeating unit (B)) of the copolymer (PC4) was 91/9 (mol/mol). Accordingly, the ratio, [(A1)/(B)], of the molar number of the repeating unit (A1) to the molar number of the repeating unit (B) was 91/9 (mol/mol).

The evaluation results of properties of the copolymer (PC4) are shown in Table 1.

A film could not be produced since the polymer (PC4) was swelled with a solvent but was not dissolved therein.

Comparative Example 5

Synthesis of Norbornene Compound Addition Polymer (PC5)

A norbornene compound was polymerized to give 1,080 parts of a copolymer (PC5) in the same manner as in Example 1 except that the amount of styrene was changed to 1,200 parts.

The resulting copolymer (PC5) was soluble in toluene and chloroform. The copolymer (PC5) had Mn of 48,000 and Mw of 121,000, and the compositional ratio of NB units (repeating unit (A1))/NBOAc units (repeating unit (B)) of the copolymer (PC5) was 94/6 (mol/mol). Accordingly, the ratio, [(A1)/(B)], of the molar number of the repeating unit (A1) to the molar number of the repeating unit (B) was 94/6 (mol/mol).

The evaluation results of properties of the copolymer (PC5) are shown in Table 1.

A film having a thickness of 100 μm was obtained from the copolymer (PC5) in the same manner as in Example 1.

The measurement results of glass transition temperature, water absorption ratio and linear expansion coefficient of a piece of the resulting film are shown in Table 1.

TABLE 1

|  | Example 1 | Example 2 | Example 3 | Example 4 |
|---|---|---|---|---|
| Norbornene addition copolymer | P1 | P2 | P3 | P4 |
| Composition (% by mol) | | | | |
| Repeating unit (A1) | | | | |
| NB (*1) | 95 | 85 | 92 | 58 |
| MTHF (*2) | — | — | — | 25 |
| Repeating unit (B) | | | | |
| NBOAc (*3) | 5 | — | — | — |
| TCDMA (*4) | — | 15 | — | — |
| NBMMA (*5) | — | — | 8 | — |
| MCNB (*6) | — | — | — | 17 |
| Repeating unit other than (A1) and (B) | | | | |
| NBSET (*7) | — | — | — | — |
| Molecular weight | | | | |
| Mn (×10$^4$) | 15.7 | 21.7 | 19.2 | 17.9 |
| Mw (×10$^4$) | 40.3 | 56.4 | 50.4 | 40.9 |
| Solubility in chloroform | Soluble | Soluble | Soluble | Soluble |
| Film | | | | |
| Total light transmittance (%) | 91 | 91 | 91 | 91 |
| Glass transition temperature (° C.) | 309 | 315 | 320 | 312 |
| Water absorption ratio (%) | <0.01 | 0.01 | <0.01 | 0.01 |
| Linear expansion coefficient (ppm/° C.) | 56 | 57 | 55 | 54 |
| Film strength (occurrence of cracks) | None | None | None | None |

|  | Comparative Example 1 | Comparative Example 2 | Comparative Example 3 | Comparative Example 4 | Comparative Example 5 |
|---|---|---|---|---|---|
| Norbornene addition copolymer | PC1 | PC2 | PC3 | PC4 | PC5 |
| Composition (% by mol) | | | | | |
| Repeating unit (A1) | | | | | |
| NB (*1) | 100 | 66 | 85 | 91 | 94 |
| MTHF (*2) | — | — | — | — | — |
| Repeating unit (B) | | | | | |
| NBOAc (*3) | — | 34 | — | 9 | 6 |
| TCDMA (*4) | — | — | — | — | — |
| NBMMA (*5) | — | — | — | — | — |
| MCNB (*6) | — | — | — | — | — |
| Repeating unit other than (A1) and (B) | | | | | |
| NBSET (*7) | — | — | 15 | — | — |
| Molecular weight | | | | | |
| Mn (×10$^4$) | — | 8.6 | 21.1 | 43.3 | 4.8 |
| Mw (×10$^4$) | — | 25.5 | 51.4 | 121.0 | 12.1 |
| Solubility in chloroform | Insoluble | Soluble | Soluble | Swellable | Soluble |
| Film | | | | | |
| Total light transmittance (%) | — | 91 | 91 | — | 91 |
| Glass transition temperature (° C.) | — | 310 | 309 | — | 305 |
| Water absorption ratio (%) | — | 1.5 | 0.08 | — | <0.01 |
| Linear expansion coefficient (ppm/° C.) | — | 65 | 147 | — | 55 |
| Film strength (occurrence of cracks) | — | Found | None | — | Found |

Footnote for Table 1
(*1): 2-norbornene
(*2): 1,4-methano-1,4,4a,9a-tetrahydro-9H-fluorene
(*3): 5-acetoxy-2-norbornene
(*4): 9-methoxycarbonyltetracyclo[6.2.1.1$^{3,6}$.0$^{2,7}$]dodec-4-ene
(*5): 5-methyl-5-methoxycarbonyl-2-norbornene
(*6): 5-methoxycarbonyl-2-norbornene
(*7): 5-triethoxysilyl-2-norbornene It is understood from the results in Table 1 that a film cannot be formed from polynorbornene comprised of only the repeating unit (A1) (Comparative Example 1).

It is also understood that the water absorption ratio is increased in the case where the polymer does not correspond to the norbornene compound addition polymer (I) since the repeating unit (A2) is not contained and where the ratio, [(A1)/(B)], of the molar number of the repeating unit (A1) to the molar number of the repeating unit (B) is lower than the range defined for the norbornene compound addition polymer (II) (Comparative Example 2).

It is also understood that only a film having a large water absorption ratio and a high linear expansion coefficient can be obtained in the case where an addition polymer corresponds to neither the norbornene compound addition polymers (I) nor (II) since both the repeating units (A2) and (B) are not contained (Comparative Example 3).

It is also understood that a film cannot be formed in the case where the polymer does not correspond to the norbornene compound addition polymer (I) since the repeating unit (A2) is not contained and where the number average molecular weight and the weight average molecular weight are lager than the ranges defined for the norbornene compound addition polymer (II) (Comparative Example 4).

It is also understood that a film suffers from cracks formed in the case where the polymer does not correspond to the norbornene compound addition polymer (I) since the repeating unit (A2) is not contained and where the number average molecular weight and the weight average molecular weight are smaller than the ranges defined for the norbornene compound addition polymer (II) (Comparative Example 5).

On the other hand, it is understood that the film of the invention comprised of the norbornene compound addition polymer (II) has a high glass transition temperature, a low water absorption ratio and a low linear expansion coefficient, and is excellent in film strength (absence of cracks) (Examples 1 to 4).

Example 5

Synthesis of Norbornene Compound Addition Polymer (P5)

0.77 part of (allyl)palladium(tricyclohexylphosphine)chloride and 1.14 parts of lithium tetrakis(pentafluorophenyl)borate were placed in a glass reactor having been substituted with nitrogen, and subsequently, 2 parts of toluene were added thereto to prepare a catalyst liquid.

1,650 parts of 2-norbornene (NB; molecular weight: 94), 915 parts of 5-ethyl-2-norbornene (E0NB; molecular weight: 122), 1,300 parts of styrene as a molecular weight modifier and 7,200 parts of toluene as a polymerization solvent were charged in a pressure-proof glass reactor equipped with a stirrer having been substituted with nitrogen, to which the catalyst liquid was added to initiate polymerization. After reacting at 45° C. for 4.5 hours, the polymerization reaction liquid was poured in a large amount of methanol to deposit the polymer completely, which was then filtered, washed and dried under reduced pressure at 50° C. for 18 hours to provide 2,462 parts of a copolymer (P5).

The resulting copolymer (P5) was soluble in toluene, chloroform and the like. The copolymer (P5) had a number average molecular weight (which may be abbreviated as "Mn" in some cases) of 140,000 and a weight average molecular weight (which may be abbreviated as "Mw" in some cases) of 502,000, and the compositional ratio of NB units (repeating unit (A1))/E0NB units (repeating unit (A2)) of the copolymer (P5) was 71/29 (mol/mol). Accordingly, the copolymer corresponded to the norbornene compound addition polymer (I) as the sum of the repeating unit (A1) and the repeating unit (A2) was 100% by mol, the ratio, [{(A1)+(A2)}/(B)], of the total molar number of the molar number of the repeating unit (A1) and the molar number of the repeating unit (A2) to the molar number of the following repeating unit (B) was 100/0, and the ratio, [(A1)/(A2)], of the molar number of the repeating unit (A1) to the molar number of the repeating unit (A2) was 71/29 (mol/mol).

The evaluation results of properties of the copolymer (P5) are shown in Table 2.

A film having a thickness of 100 µm was obtained from the copolymer (P5) in the same manner as in Example 1.

The measurement results of glass transition temperature, water absorption ratio and linear expansion coefficient of a piece of the resulting film are shown in Table 2.

Example 6

Synthesis of Norbornene Compound Addition Polymer (P6)

2,027 parts of a copolymer (P6) were obtained in the same manner as in Example 5 except that the monomers were changed to 1,175 parts of 2-norbornene (NB; molecular weight: 94) and 1,525 parts of 5,6-dimethyl-2-norbornene (DMNB; molecular weight: 122).

The resulting copolymer (P6) was soluble in toluene, chloroform and the like. The copolymer (P6) had Mn of 117,000 and Mw of 377,000, and the compositional ratio of NB units (repeating unit (A1))/DMNB units (repeating unit (A2)) of the copolymer (P6) was 52/48 (mol/mol). Accordingly, the copolymer corresponded to the norbornene compound addition polymer (I) as the sum of the repeating unit (A1) and the repeating unit (A2) was 100% by mol, the ratio, [{(A1)+(A2)}/(B)], of the total molar number of the molar number of the repeating unit (A1) and the molar number of the repeating unit (A2) to the molar number of the following repeating unit (B) was 100/0, and the ratio, [(A1)/(A2)], of the molar number of the repeating unit (A1) to the molar number of the repeating unit (A2) was 52/48 (mol/mol).

The evaluation results of properties of the copolymer (P6) are shown in Table 2.

A film having a thickness of 100 µm was obtained from the copolymer (P6) in the same manner as in Example 1.

The measurement results of glass transition temperature, water absorption ratio and linear expansion coefficient of a piece of the resulting film are shown in Table 2.

Example 7

Synthesis of Norbornene Compound Addition Polymer (P7)

1,200 parts of tetracyclo[6.2.1.1$^{3,6}$.0$^{2,7}$]dodec-4-ene (TCD; molecular weight: 160), 2,100 parts of 5-ethylidene-2-norbornene (E2NB; molecular weight: 120), 521 parts of styrene as a molecular weight modifier and 7,700 parts of toluene as a polymerization solvent were charged in a pressure-proof glass reactor equipped with a stirrer having been substituted with nitrogen, to which the same catalyst liquid as used in Example 5 was added to initiate polymerization. After reacting at 60° C. for 2 hours, the polymerization reaction liquid was poured in a large amount of methanol to deposit the polymer completely, which was then filtered, washed and dried under reduced pressure at 50° C. for 18 hours to provide 2,014 parts of a copolymer (P7).

The resulting copolymer (P7) was soluble in toluene, chloroform and the like. The copolymer (P7) had Mn of 158,000 and Mw of 355,000, and the compositional ratio of TCD units (repeating unit (A1))/E2NB units (repeating unit (A2)) of the copolymer (P7) was 27/73 (mol/mol). Accordingly, the copolymer corresponded to the norbornene compound addition polymer (I) as the sum of the repeating unit (A1) and the repeating unit (A2) was 100% by mol, the ratio, [{(A1)+(A2)}/(B)], of the total molar number of the molar number of the repeating unit (A1) and the molar number of the repeating unit (A2) to the molar number of the following repeating unit (B) was 100/0, and the ratio, [(A1)/(A2)], of the molar number of the repeating unit (A1) to the molar number of the repeating unit (A2) was 27/73 (mol/mol).

The evaluation results of properties of the copolymer (P7) are shown in Table 2.

A film having a thickness of 100 μm was obtained from the copolymer (P7) in the same manner as in Example 1.

The measurement results of glass transition temperature, water absorption ratio and linear expansion coefficient of a piece of the resulting film are shown in Table 2.

Example 8

Synthesis of Norbornene Compound Addition Polymer (P8)

2,300 parts of a copolymer (P8) were obtained in the same manner as in Example 7 except that the monomers were changed to 1,650 parts of 2-norbornene (NB; molecular weight: 94), 460 parts of 5-ethyl-2-norbornene (E0NB; molecular weight: 122) and 570 parts of 5-methoxycarbonyl-2-norbornene (MCNB; molecular weight: 152). The resulting copolymer (P8) was soluble in toluene, chloroform and the like. The copolymer (P8) had Mn of 221,000 and Mw of 582,000, and the compositional ratio of NB units (repeating unit (A1))/E0NB units (repeating unit (A2))/MCNB unit (repeating unit (B)) of the copolymer (P8) was 71/16/13 (mol/mol/mol). Accordingly, the copolymer corresponded to the norbornene compound addition polymer (I) as the sum of the repeating unit (A1) and the repeating unit (A2) was 87% by mol, the ratio, [{(A1)+(A2)}/(B)], of the total molar number of the molar number of the repeating unit (A1) and the molar number of the repeating unit (A2) to the molar number of the following repeating unit (B) was 87/13, and the ratio, [(A1)/(A2)], of the molar number of the repeating unit (A1) to the molar number of the repeating unit (A2) was 71/16 (mol/mol).

The evaluation results of properties of the copolymer (P8) are shown in Table 2.

A film having a thickness of 100 μm was obtained from the copolymer (P8) in the same manner as in Example 1.

The measurement results of glass transition temperature, water absorption ratio and linear expansion coefficient of a piece of the resulting film are shown in Table 2.

Comparative Example 6

Synthesis of Norbornene Compound Addition Polymer (PC6)

1,175 parts of 2-norbornene (NB; molecular weight: 94), 2,230 parts of 5-hexyl-2-norbornene (HNB; molecular weight: 178) and 4,000 parts of toluene as a polymerization solvent were charged in a pressure-proof glass reactor equipped with a stirrer having been substituted with nitrogen, to which the same catalyst liquid as used in Comparative Example 1 was added to initiate polymerization. After reacting at 60° C. for 2.5 hours, the polymerization reaction liquid was poured in a large amount of methanol to deposit the polymer completely, which was then filtered, washed and dried under reduced pressure at 50° C. for 18 hours to provide 2,834 parts of a copolymer (PC6).

The resulting copolymer (PC6) was soluble in toluene, chloroform and the like. The copolymer (PC6) had Mn of 134,000 and Mw of 314,000, and the compositional ratio of NB units (repeating unit (A1))/HNB units (repeating unit other than repeating units (A1), (A2) and (B)) of the copolymer (PC6) was 51/49 (mol/mol). Accordingly, the sum of the repeating unit (A1) and the repeating unit (A2) was 51% by mol, the ratio, [{(A1)+(A2)}/(B)], of the total molar number of the molar number of the repeating unit (A1) and the molar number of the repeating unit (A2) to the molar number of the following repeating unit (B) was 51/0, and the ratio, [(A1)/(A2)], of the molar number of the repeating unit (A1) to the molar number of the repeating unit (A2) was 51/0 (mol/mol).

The evaluation results of properties of the copolymer (PC6) are shown in Table 2.

A film having a thickness of 100 μm was obtained from the copolymer (PC6) in the same manner as in Example 1.

The measurement results of glass transition temperature, water absorption ratio and linear expansion coefficient of a piece of the resulting film are shown in Table 2.

Comparative Example 7

Synthesis of Norbornene Compound Addition Polymer (PC7)

2,400 parts of 5-ethylidene-2-norbornene (E2NB; molecular weight: 120), 1,280 parts of 5-triethoxysilyl-2-norbornene (NBSET; molecular weight: 256), 521 parts of styrene as a molecular weight modifier and 8,600 parts of toluene as a polymerization solvent were charged in a pressure-proof glass reactor equipped with a stirrer having been substituted with nitrogen, to which the same catalyst liquid as used in Example 1 was added to initiate polymerization. After reacting at 60° C. for 3 hours, the polymerization reaction liquid was poured in a large amount of methanol to deposit the polymer completely, which was then filtered, washed and dried under reduced pressure at 50° C. for 18 hours to provide 2,905 parts of a copolymer (PC7).

The resulting copolymer (PC7) was soluble in toluene, chloroform and the like. The copolymer (PC7) had Mn of 195,000 and Mw of 475,000, and the compositional ratio of E2NB units (repeating unit (A2))/NBSET units (repeating unit other than repeating units (A1), (A2) and (B)) of the copolymer (PC7) was 88/12 (mol/mol). Accordingly, the sum of the repeating unit (A1) and the repeating unit (A2) was 88% by mol, the ratio, [{(A1)+(A2)}/(B)], of the total molar number of the molar number of the repeating unit (A1) and the molar number of the repeating unit (A2) to the molar number of the following repeating unit (B) was 88/0, and the ratio, [(A1)/(A2)], of the molar number of the repeating unit (A1) to the molar number of the repeating unit (A2) was 0/88 (mol/mol).

The evaluation results of properties of the copolymer (PC7) are shown in Table 2.

A film having a thickness of 100 μm was obtained from the copolymer (PC7) in the same manner as in Example 1.

The measurement results of glass transition temperature, water absorption ratio and linear expansion coefficient of a piece of the resulting film are shown in Table 2.

TABLE 2

|  | Example 5 | Example 6 | Example 7 | Example 8 | Comparative Example 6 | Comparative Example 7 |
|---|---|---|---|---|---|---|
| Norbornene addition copolymer | P5 | P6 | P7 | P8 | PC6 | PC7 |
| Composition (% by mol) | | | | | | |
| Repeating unit (A1) | | | | | | |
| NB (*1) | 71 | 52 | — | 71 | 51 | — |
| TCD (*2) | — | — | 27 | — | — | — |
| Repeating unit (A2) | | | | | | |
| E0NB (*3) | 29 | — | — | 16 | — | — |
| DMNB (*4) | — | 48 | — | — | — | — |
| E2NB (*5) | — | — | 73 | — | — | 88 |
| Repeating unit (B) | | | | | | |
| MCNB (*6) | — | — | — | 13 | — | — |
| Repeating unit other than (A1), (A2) and (B) | | | | | | |
| HNB (*7) | — | — | — | — | 49 | — |
| NBSET (*8) | — | — | — | — | — | 12 |
| Molecular weight | | | | | | |
| Mn (×10$^4$) | 14.0 | 11.7 | 15.8 | 22.1 | 13.4 | 19.5 |
| Mw (×10$^4$) | 50.2 | 37.7 | 35.5 | 58.2 | 31.4 | 47.5 |
| Solubility in chloroform | Soluble | Soluble | Soluble | Soluble | Soluble | Soluble |
| Film | | | | | | |
| Total light transmittance (%) | 91 | 91 | 91 | 91 | 91 | 91 |
| Glass transition temperature (° C.) | 281 | 301 | 315 | 310 | 199 | 309 |
| Water absorption ratio (%) | <0.01 | <0.01 | <0.01 | 0.01 | <0.01 | 0.08 |
| Linear expansion coefficient (ppm/° C.) | 64 | 51 | 70 | 60 | 164 | 147 |

Footnote for Table 2
(*1): 2-norbornene
(*2): tetracyclo[6.2.1.1$^{3,6}$.0$^{2,7}$]dodec-4-ene
(*3): 5-ethyl-2-norbornene
(*4): 5,6-dimethyl-2-norbornene
(*5): 5-ethylidene-2-norbornene
(*6): 5-methoxycarbonyl-2-norbornene
(*7): 5-hexyl-2-norbornene
(*8): 5-ethoxysilyl-2-norbornene It is understood from the results in Table 2 that the linear expansion coefficient is increased in the case where the polymer does not correspond to the norbornene compound addition polymer (II) since the repeating unit (B) is not contained and where the ratio, [(A1)/(A2)], of the molar number of the repeating unit (A1) to the molar number of the repeating unit (A2) is outside the range defined for the norbornene compound addition polymer (I) (Comparative Examples 6 and 7). In Comparative Example 6, the film has a low water absorption ratio, and it is considered that this is because the film does not contain a repeating unit containing a functional group.

On the other hand, it is understood that the film of the invention containing the norbornene compound addition polymer (I) has a high glass transition temperature, a low water absorption ratio and a low linear expansion coefficient, and is excellent in film strength (Examples 5 to 8).

The invention claimed is:
1. A film comprising:
a norbornene compound addition polymer (I) essentially consisting of repeating units derived from norbornene compound monomers, wherein a sum of the following repeating unit (A1) and the following repeating unit (A2) is 70% by mol or more based on the total repeating units derived from norbornene compound monomers in the norbornene compound addition polymer (I); a ratio, [{(A1)+(A2)}/(B)], of a total molar number of a molar number of the repeating unit (A1) and a molar number of the repeating unit (A2) to a molar number of the following repeating unit (B) in the norbornene compound addition polymer (I) is in the range of from 70/30 to 100/0; a ratio, [(A1)/(A2)], of a molar number of the repeating unit (A1) to a molar number of the repeating unit (A2) in the norbornene compound addition polymer (I) is in the range of from 10/90 to 98/2; and a weight average molecular weight of the norbornene compound addition polymer (I) is from 50,000 to 1,000,000, or
a norbornene compound addition polymer (II) essentially consisting of the following repeating unit (A1) and the following repeating unit (B), wherein a ratio, [(A1)/(B)], of a molar number of the repeating unit (A1) to a molar number of the repeating unit (B) in the norbornene compound addition polymer (II) is in the range of from 70/30 to 98/2; a weight average molecular weight of the norbornene compound addition polymer (II) is from 300,000 to 700,000; and a num- ber average molecular weight of the norbornene compound addition polymer (II) is from 80,000 to 350,000:

Repeating unit (A1): a repeating unit derived from a norbornene compound monomer consisting of carbon atoms and hydrogen atoms with all the carbon atoms being involved in constitution of a condensed ring skeleton, Repeating unit (A2): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a hydrocarbon group having 2 or less carbon atoms, Repeating unit (B): a repeating unit derived from a norbornene compound monomer having a structure where a part of hydrogen atoms of a norbornene compound monomer, consisting of carbon atoms and hydrogen atoms with all the carbon atoms being involved in constitution of a condensed ring skeleton, is substituted with only a functional group having 2 or less carbon atoms, or substituted with only a functional group having 2 or less carbon atoms and a hydrocarbon group having 2 or less carbon atoms.

2. The film according to claim 1, wherein the norbornene compound addition polymers (I) and (II) are each a norbornene compound addition polymer that comprises, as the repeating unit (A1), a repeating unit derived from a norbornene compound monomer (a1) having no other unsaturated bond than a norbornene ring.

3. The film according to claim 1, wherein the repeating unit (A2) is a repeating unit derived from a norbornene compound having an alkyl group having 2 or less carbon atoms or a tetracyclo[$6.2.1.1^{3,6}.0^{2,7}$]dodec-4-ene compound having an alkyl group having 2 or less carbon atoms.

4. The film according to claim 1, wherein a weight average molecular weight of the norbornene compound addition polymer (I) is from 300,000 to 700,000 and a number average molecular weight of the norbornene compound addition polymer (I) is from 80,000 to 350,000.

5. The film according to claim 1, wherein a linear expansion coefficient of the film is 75 ppm/° C. or less.

6. The film according to claim 1, wherein a water absorption ratio of the film is 0.1% by weight or less.

7. The film according to claim 1, wherein the film has a transparent electroconductive film laminated thereon.

8. The film according to claim 1, wherein the film has a gas barrier film laminated thereon.

9. The film according to claim 1, wherein the film is an optical film.

10. The film according to claim 9, wherein the film is a member for a display device.

* * * * *